May 10, 1949.　　　　　S. STEIN　　　　　2,469,417
TORSIONAL VIBRATION PICKUP

Filed June 13, 1945　　　　　　　　　　　　2 Sheets-Sheet 1

INVENTOR.
Samuel Stein
BY
Ralph L. Chappell
ATTORNEY

May 10, 1949. S. STEIN 2,469,417
TORSIONAL VIBRATION PICKUP
Filed June 13, 1945 2 Sheets-Sheet 2

INVENTOR.
Samuel Stein
BY
Ralph L. Chappell
ATTORNEY

Patented May 10, 1949

2,469,417

UNITED STATES PATENT OFFICE 2,469,417

TORSIONAL VIBRATION PICKUP

Samuel Stein, New York, N. Y.

Application June 13, 1945, Serial No. 599,285

21 Claims. (Cl. 171—209)

(Granted under the act of March 3, 1883, as amended April 30, 1928; 370 O. G. 757)

This invention relates to improvements in torsional vibration pickups and more particularly to devices for attachment to an end of a rotating shaft to actuate suitable indicating or recording devices in accordance with the frequency and amplitude of the torsional vibrations of the rotating shaft.

The primary object of this invention is to provide a torsional vibration pickup of extreme sensitivity, even at low frequencies and small amplitudes.

Another object is to provide a torsional vibration pickup that is substantially unaffected by any vibration other than torsional.

Still another object is to provide a torsional vibration pickup that is damped hydraulically.

Further objects and advantages of this invention, as well as its construction, arrangement and operation, will be apparent from the following description and claims in connection with the accompanying drawings, in which Fig. 1 is a top plan view, partly in section, of a torsional vibration pickup, showing a preferred embodiment of this invention;

Figure 1:
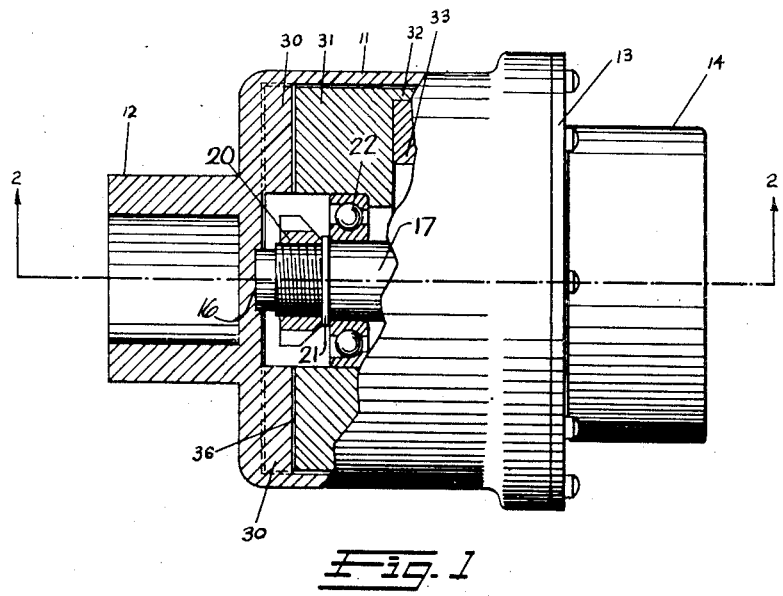

Similar numerals refer to similar parts throughout the several views. Fig. 1 shows an outer case 11, formed into an integral hub 12 at one end, and closed by end plate 13 at the other. Brush housing 14 adjoins end plate 13.

Hub 12 is provided with a socket setscrew 15 (Fig. 2) by means of which the outer case 11 can be affixed to the end of a shaft. A recess 16 is located centrally in the flange of outer case 11. Into recess 16 extends the end of stub shaft 17. The opposite end of said stub shaft extends through end plate 13 and into brush housing 14. End plate 13 is affixed rigidly to stub shaft 17, or is integral therewith. Stub shaft 17, near end plate 13, is provided with a shoulder 18, upon which bears the inner race of an anti-friction bearing 19, preferably of the magneto type, such as the axially separable bearings of that designation manufactured by New Departure Bearing Co., Bristol, Conn. Lock nut 20 is in threaded engagement with stub shaft 17 near its flange end, and through the medium of lock washer 21 bears upon the inner race of anti-friction bearing 22, which is of similar type and opposed to anti-friction bearing 19.

Figure 2:
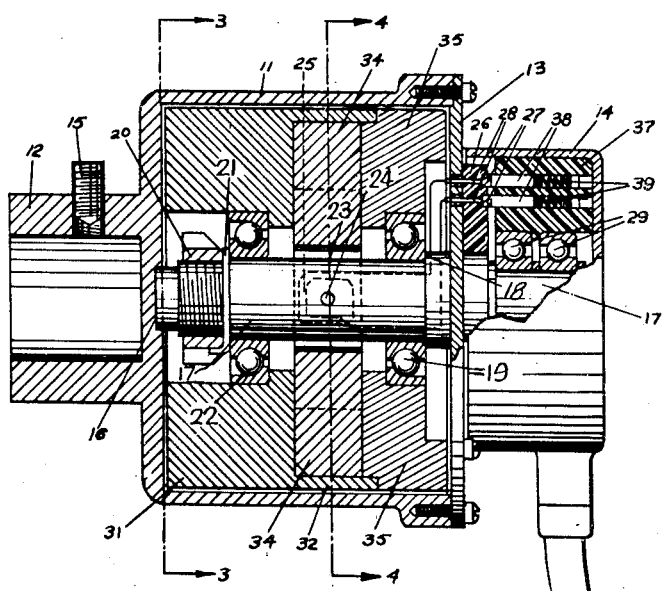
Fig. 2 is a longitudinal vertical section through the device, taken along the line 2—2 of Fig. 1.
Figure 4:
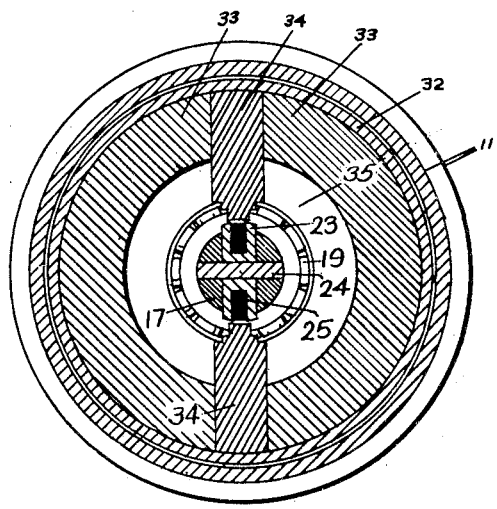
Fig. 4 is a transverse section through the device, taken along the line 4—4 of Fig. 2.

A rectangular slot extends through stub shaft 17, and an armature 23, preferably of highly permeable iron, is contained therein and suitably retained as by pin 24 (Figs. 2 and 4). Armature 23 is bobbin-shaped, and contains a coil 25 of fine wire, wound about the center of the armature 23 and insulated therefrom.

Figure 3:
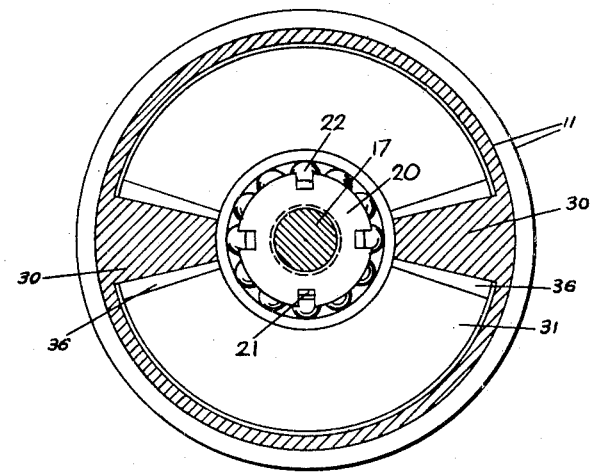
Fig. 3 is a transverse section through the device, taken along the line 3—3 of Fig. 2.

Encircling stub shaft 17 and adjacent to the outer surface of end plate 13 is an insulating pad 26. Slip rings 27 are mounted in the outer surface of insulating pad 26, and are connected to the ends of coil 25 by means of insulated leads 28, which extend through insulating pad 26 and end plate 13. On the end of stub shaft 17 extending into brush housing 14 are mounted the inner races of two anti-friction bearings 29. A plurality of radial damping fins 30 project inwardly from the inner surface of the flange of outer case 11 (Figs. 1 and 3).

All parts previously described are interconnected rigidly and incapable of movement relative to each other, and can be affixed rigidly to the end of a shaft by means of hub 12. The remaining parts contained within outer case 11 are capable of limited rotary motion relative to the first group of parts and to any shaft to which the device is secured, and will be referred to collectively as the inertia mass.

The inertia mass comprises an inertia ring 31 of non-magnetic material, said ring 31 being provided with an annular lip 32. Contained within lip 32 are two substantially semicircular permanent bar magnets 33 and two pole pieces 34 (Fig. 4). The lip 32 completely encloses bar magnets 33 and pole pieces 34, and extends beyond into a recess in inertia ring 35, also of non-magnetic material. The surface of inertia ring 31 opposite lip 32 is provided with multiple radial recesses 36, corresponding in number and position to damping fins 30 (Fig. 3). Inertia rings 31 and 35 bear upon the outer races of anti-friction bearings 22 and 19, respectively. The inertia rings 31 and 35, bar magnets 33, pole pieces 34, and the outer races of anti-friction bearings 19 and 22 constitute the inertia mass.

Brush housing 14 is supported on the outer races of anti-friction bearings 29 by means of insulating ring 37. Brushes 38, backed by springs 39, extend from insulating ring 37, ride upon slip rings 27, and transmit electrical impulses from slip rings 27 to wires 40, which extend from brush housing 14 to conventional indicating or recording devices, not claimed as part of this invention, and not shown.

In operation, the device functions as follows:

The device is secured to the end of a shaft by means of hub 12 and socket setscrew 15. When the affixed shaft is rotating, the entire device rotates with it, with the exception of brush housing 14, insulating ring 37, brushes 38, springs 39 and wires 40. This stationary portion of the device rides freely on the outer end of stub shaft 17, through the medium of anti-friction bearings 29.

Recesses 36, (Fig. 3) are somewhat larger than damping fins 30, allowing several degrees of relative rotary motion between outer case 11 and inertia ring 31. In other words, the inertia mass is free to oscillate on anti-friction bearings 19 and 22 with respect to stub shaft 17 and the other fixed parts, to the limits permitted by the shoulders of recesses 36. With the device of this invention rotating with the end of a shaft, the rotating parts of the pickup rotate at the same average velocity as the shaft.

Torsional vibrations in the rotating shaft will result in accelerations and decelerations of rotational velocity at the shaft end. The fixed portion of the pickup will accelerate and decelerate with the shaft end and will always have the same instantaneous rotational velocity. The inertia mass, however, will resist accelerations and decelerations of the shaft end and the fixed portion of the pickup, and will change its angular position relative to them with every acceleration and deceleration.

The rotary oscillation of the inertia mass relative to the fixed portion of the pickup is resisted by two factors. First, the interstices between the parts contained within outer case 11 and end plate 13 are filled with a moderately viscous fluid, such as light mineral oil. The movement of damping fins 30 within recesses 36 through this fluid exerts a damping effect that limits rotary oscillation of the inertia mass relative to the fixed portion of the pickup to the value of the externally applied amplitude, overcoming any tendency of the instrument to resonate. Second, armature 23 forms a magnetic circuit with pole pieces 34, reluctance of which is low due to the small clearance between armature 23 and the adjacent ends of pole pieces 34. The magnetic field between pole pieces 34 resists any rotation of armature 23 relative to it and in addition acts to return armature 23 to its normal position directly in line with pole pieces 34 whenever such rotational deviation occurs.

Armature 23 contains coil 25, which oscillates with armature 23 in a rotary manner relative to the magnetic field between pole pieces 34. This oscillation induces an alternating current in coil 25, the voltage of which varies with the maximum angular deviation between armature 23 and pole pieces 34, and the frequency of the oscillation. This induced current is carried by wires 40 to conventional indicating and recording instruments that indicate and record the frequency and amplitude of the oscillation.

The pickup of this invention is substantially unaffected by any vibrations other than torsional. By using magneto bearings for anti-friction bearings 19 and 22, all clearance within the device is taken up without unduly loading the bearings, or unduly affecting the sensitivity of the device. The fixed portion of the pickup is fixed rigidly to the shaft end, and the inertia mass has but one type of freedom, oscillatory with respect to the fixed portion.

Extreme sensitivity is achieved by the anti-friction mounting of the inertia mass, and the inertia mass responds to impressed vibrations of extremely small amplitude even though of low frequency. The device is sealed and not subject, therefore, to the introduction of foreign material. Most of the parts are immersed completely in the damping fluid, which also serves as a lubricant and preservative.

Because of hydraulic damping the current induced indicates the amplitude of the torsional vibrations of the affixed shaft with high accuracy. Especially at low frequencies, an undamped pickup tends to indicate an amplitude higher than that actually impressed on the pickup by the vibrations of the affixed shaft, due to resonance of the pickup itself. The hydraulically damped pickup, it has been found, even at low frequencies gives amplitude indications entirely unaffected by pickup resonance.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A pickup device comprising a sealed case, a concentric mass mounted rotatably within said case upon spaced anti-friction bearings, said concentric mass containing two opposed magnetized poles, a bar of highly permeable material supported by said case and disposed between said magnetic poles, a coil of wire wound upon said bar, said coil being positioned in a vertical longitudinal plane passing through the axis of said case and said concentric mass, means external of said case connected electrically to the ends of said coil, and means enclosed in said case for hydraulically damping rotational oscillations of said mass relative to said case.

2. A pickup device comprising a sealed case mounted fixedly on a coaxial shaft, a concentric mass mounted rotatably about said shaft within said case upon spaced anti-friction bearings, said concentric mass containing two opposed magnetized pole pieces so disposed as to generate a magnetic field across a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said case and connected electrically to the ends of said coil, and means enclosed in said case for hydraulically damping rotational oscillations of said mass relative to said case.

3. A pickup device comprising a sealed case mounted fixedly on a coaxial shaft, a concentric mass mounted rotatably about said shaft within said case upon spaced anti-friction bearings, said concentric mass containing two opposed magnetized pole pieces so disposed as to generate a magnetic field across a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said case and connected electrically to the ends of said coil, means in contact with said slip rings mounted rotatably on an extension of said shaft external of said case, a viscous fluid filling the cavities within said case, said concentric mass and said case being provided with a plurality of damping fins and cooperating recesses.

4. A pickup device comprising a sealed case mounted fixedly on a coaxial shaft, a concentric mass mounted rotatably about said shaft within said case upon spaced anti-friction bearings, said concentric mass containing a plurality of permanent magnets and two opposed pole pieces so disposed as to generate a magnetic field across a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said case and connected electrically to the ends of said coil, conducting means in contact with said slip rings mounted rotatably on an extension of said shaft external of said case, a viscous fluid filling the cavities within said case, said concentric mass and said case being provided with a plurality of damping fins and cooperating recesses, and means for coaxially mounting the pickup device on an external shaft.

5. A pickup device comprising a sealed case, a concentric mass mounted rotatably within said case upon a plurality of spaced anti-friction bearings, said concentric mass containing two opposed magnetized poles, a bar of highly permeable material supported by said case and disposed between said magnetic poles, a coil of wire wound upon said bar, said coil being positioned in a vertical longitudinal plane passing through the mutual axis of said case and said concentric mass, means external of said case connected electrically to the ends of said coil, and means enclosed in said case for hydraulically damping rotational oscillations of said mass relative to said case.

6. A pickup device comprising a sealed case mounted fixedly on a coaxial shaft, a concentric mass mounted rotatably about said shaft within said case upon a plurality of spaced anti-friction bearings, said concentric mass containing two opposed magnetized pole pieces so disposed as to generate a magnetic field across a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said case and connected electrically to the ends of said coil, and means enclosed in said case for hydraulically damping rotational oscillations of said mass relative to said case.

7. A pickup device comprising a sealed case mounted fixedly on a coaxial shaft, a concentric mass mounted rotatably about said shaft within said case upon a plurality of spaced anti-friction bearings, said concentric mass containing two opposed magnetized pole pieces so disposed as to generate a magnetic field across a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said case and connected electrically to the ends of said coil, means in contact with said slip rings mounted rotatably on an extension of said shaft external of said case, a viscous fluid filling the cavities within said case, said concentric mass and said case being provided with a plurality of damping fins and cooperating recesses.

8. A pickup device comprising a sealed case mounted fixedly on a coaxial shaft, a concentric mass mounted rotatably about said shaft within said case upon a plurality of spaced anti-friction bearings, said concentric mass containing a plurality of permanent magnets and two opposed pole pieces so disposed as to generate a magnetic field across a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said case and connected electrically to the ends of said coil, conducting means in contact with said slip rings mounted rotatably on an extension of said shaft external of said case, a viscous fluid filling the cavities within said case, said concentric mass and said case being provided with a plurality of damping fins and cooperating recesses, and means for coaxially mounting the pickup device on an external shaft.

9. A pickup device comprising a sealed case, a concentric mass mounted rotatably within said case upon a plurality of spaced magneto-type anti-friction bearings, said concentric mass containing two opposed magnetized poles, a bar of highly permeable material supported by said case and disposed between said magnetic poles, a coil of wire wound upon said bar, said coil being positioned in a vertical longitudinal plane passing through the mutual axis of said case and said concentric mass, means external of said case connected electrically to the ends of said coil, and means enclosed in said case for hydraulically damping rotational oscillations of said mass relative to said case.

10. A pickup device comprising a sealed case fixedly mounted on a coaxial shaft, a concentric mass mounted rotatably about said shaft within said case upon a plurality of spaced magneto-type anti-friction bearings, said concentric mass containing two opposed magnetized pole pieces so disposed as to generate a magnetic field cross a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said case and connected electrically to the ends of said coil, and means enclosed in said case for hydraulically damping rotational oscillations of said mass relative to said case.

11. A pickup device comprising a sealed case mounted fixedly on a coaxial shaft, a concentric mass mounted rotatably about said shaft within said case upon a plurality of spaced magneto-type anti-frictional bearings, said concentric mass containing two opposed magnetized pole pieces so disposed as to generate a magnetic field across a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said case and connected electrically to the ends of said coil, means in contact with said slip rings mounted rotatably on an extension of said shaft external of said case, a viscous fluid filling the cavities within said case, said concentric mass and said case being provided with a plurality of damping fins and cooperating recesses.

12. A pickup device comprising a sealed case mounted fixedly on a coaxial shaft, a concentric mass mounted rotatably about said shaft within said case upon a plurality of spaced magneto-type anti-friction bearings, said concentric mass containing a plurality of permanent magnets and two opposed pole pieces so discposed as to generate a magnetic field across a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said case and connected electrically to the ends of said coil, conducting means in contact with said slip rings mounted rotatably on an extension of said shaft external of said case, a viscous fluid filling the cavities within said case, said concentric mass and said case being provided with a plurality of damping fins and cooperating recesses, and means for coaxially mounting the pickup device on an external shaft.

13. A pickup device comprising a sealed case, a concentric mass mounted rotatably within said case upon a plurality of spaced magneto-type anti-friction bearings, means for varying the tension exerted by said bearings, said concentric mass containing two opposed magnetized poles, a bar of highly permeable material supported by said case and disposed between said magnetic poles, a coil of wire wound upon said bar, said coil being positioned in a vertical longitudinal plane passing through the mututal axis of said case and said concentric mass, means external of said case connected electrically to the ends of said coil, and means enclosed in said case for hydraulically damping rotational oscillations of said mass relative to said case.

14. A pickup device comprising a sealed case mounted fixedly on a coaxial shaft, a concentric mass mounted rotatably about said shaft within said case upon a plurality of spaced magneto-type anti-friction bearings, means for varying the tension exerted by said bearings, said concentric mass containing two opposed magnetized pole pieces so disposed as to generate a magnetic field across a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said case and connected electrically to the ends of said coil, and means enclosed in said case for hydraulically damping rotational oscillations of said mass relative to said case.

15. A pickup device comprising a sealed case mounted fixedly on a coaxial shaft, a concentric mass mounted rotatably about said shaft within said case upon a plurality of spaced magneto-type anti-friction bearings, means for varying the tension exerted by said bearings, said concentric mass containing two opposed magnetized pole pieces so disposed as to generate a magnetic field across a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said coil, means in contact with said slip rings mounted rotatably on an extension of said shaft external of said case, a viscous fluid filling the cavities within said case, said concentric mass and said case being provided with a plurality of damping fins and cooperating recesses.

16. A pickup device comprising a sealed case mounted fixedly on a coaxial shaft, a concentric mass mounted rotatably about said shaft within said case upon a plurality of spaced magneto-type anti-friction bearings, means for varying the tension exerted by said bearings, said concentric mass containing a plurality of permanent magnets and two opposed pole pieces so disposed as to generate a magnetic field across a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said case and connected electrically to the ends of said coil, conducting means in contact with said slip ring mounted rotatably on an extension of said shaft external of said case, a viscous fluid filling the cavities within said case, said concentric mass and said case being provided with a plurality of damping fins and cooperating recesses, and means for coaxially mounting the pickup device on an external shaft.

17. A pickup device comprising a sealed case, a concentric mass mounted rotatably within said case upon a plurality of spaced magneto-type anti-friction bearings, a lock nut and lock washer mounted on said shaft and adapted to vary the tension exerted by said bearings, said concentric mass containing two opposed magnetized poles, a bar of highly permeable material supported by said case and disposed between said magnetic poles, a coil of wire wound upon said bar, said coil being positioned in a vertical longitudinal plane passing through the mutual axis of said case and said concentric mass, means external of said case connected electrically to the ends of said coil, and means enclosed in said case for hydraulically damping rotational oscillations of said mass relative to said case.

18. A pickup device comprising a sealed case mounted fixedly on a coaxial shaft, a concentric mass mounted rotatably about said shaft within said case upon a plurality of spaced magneto-type anti-friction bearings, a lock nut and lock washer mounted on said shaft and adapted to vary the tension exerted by said bearings, said concentric mass containing two opposed magnetized pole pieces so disposed as to generate a magnetic field across a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said case and connected electrically to the ends of said coil, and means enclosed in said case for hydraulically damping rotational oscillations of said mass relative to said case.

19. A pickup device comprising a sealed case mounted fixedly on a coaxial shaft, a concentric mass mounted rotatably about said shaft within said case upon a plurality of spaced magneto-type anti-friction bearings, a lock nut and lock washer mounted on said shaft and adapted to vary the tension exerted by said bearings, said concentric mass containing two opposed magnetized pole pieces so disposed as to generate a magnetic field across a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said case and connected electrically to the ends of said coil, means in contact with said slip rings mounted rotatably on an extension of said shaft external of said case, a viscous fluid filling the cavities within said case, said concentric mass and said case being provided with a plurality of damping fins and cooperating recesses.

20. A pickup device comprising a sealed case mounted fixedly on a coaxial shaft, a concentric mass mounted rotatably about said shaft within said case upon a plurality of spaced magneto-type anti-friction bearings, a lock nut and lock washer mounted on said shaft and adapted to vary the tension exerted by said bearings, said concentric mass containing a plurality of permanent magnets and two opposed pole pieces so disposed as to generate a magnetic field across a section of said shaft, a bar of highly permeable material extending through said shaft between said pole pieces, a coil of wire enclosing said bar, said coil being positioned in a vertical longitudinal plane passing through the axis of said shaft, concentric slip rings mounted externally of said case and connected electrically to the ends of said coil, conducting means in contact with said slip rings mounted rotatably on an extension of said shaft external of said case, a viscous fluid filling the cavities within said case, said concentric mass and asid case being provided with a plurality of damping fins and cooperating recesses, and means for coaxially mounting the pickup device on an external shaft.

21. A pickup device comprising a sealed case, a concentric mass mounted rotatively within said case upon a plurality of spaced magneto-type anti-friction bearings, said concentric mass containing two opposed magnetized poles, a bar of highly permeable material supported by said case and disposed between said magnetic poles, a coil of wire wound upon said bar, said coil being positioned in a vertical longitudinal plane passing through the mutual axis of said case and said concentric mass, whereby a fixed air gap is maintained between said poles and said coil, means external of said case connected electrically to the ends of said coil, and means enclosed in said case for hydraulically damping rotational oscillations of said mass relative to said case.

SAMUEL STEIN.

REFERENCES CITED

The following references are of record in the file of this patent:

UNITED STATES PATENTS

| Number | Name | Date |
|---|---|---|
| 1,823,326 | Legg | Sept. 15, 1931 |
| 2,299,081 | Draper | Oct. 20, 1942 |
| 2,387,223 | Carson | Oct. 16, 1945 |
| 2,396,549 | Stansfield | Mar. 12, 1946 |

FOREIGN PATENTS

| Number | Country | Date |
|---|---|---|
| 423,706 | Great Britain | Feb. 6, 1935 |

---

Certificate of Correction

Patent No. 2,469,417. May 10, 1949.

SAMUEL STEIN

It is hereby certified that errors appear in the printed specification of the above numbered patent requiring correction as follows:

Column 6, line 39, claim 10, for the words "fixedly mounted" read *mounted fixedly*; column 7, line 7, for "discposed" read *disposed*; line 34, for "mututal" read *mutual*; column 9, line 32, for "asid case" read *acid case*;

and that the said Letters Patent should be read with these corrections therein that the same may conform to the record of the case in the Patent Office.

Signed and sealed this 8th day of November, A. D. 1949.

[SEAL]

THOMAS F. MURPHY,
*Assistant Commissioner of Patents.*

Certificate of Correction

Patent No. 2,469,417. May 10, 1949.

SAMUEL STEIN

It is hereby certified that errors appear in the printed specification of the above numbered patent requiring correction as follows:

Column 6, line 39, claim 10, for the words "fixedly mounted" read *mounted fixedly*; column 7, line 7, for "discposed" read *disposed*; line 34, for "mututal" read *mutual*; column 9, line 32, for "asid case" read *acid case*;

and that the said Letters Patent should be read with these corrections therein that the same may conform to the record of the case in the Patent Office.

Signed and sealed this 8th day of November, A. D. 1949.

[SEAL]

THOMAS F. MURPHY,
*Assistant Commissioner of Patents.*

Certificate of Correction

Patent No. 2,469,417 — May 10, 1949

SAMUEL STEIN

It is hereby certified that errors appear in the printed specification of the above numbered patent requiring correction as follows:

Column 6, line 39, claim 10, for the words "fixedly mounted" read *mounted fixedly*; column 7, line 7, for "discposed" read *disposed*; line 34, for "mututal" read *mutual*; column 9, line 32, for "asid case" read *said case*;

and that the said Letters Patent should be read with these corrections therein that the same may conform to the record of the case in the Patent Office.

This certificate supersedes Certificate of Correction issued November 8, 1949.
Signed and sealed this 10th day of January, A. D. 1950.

[SEAL]

THOMAS F. MURPHY,
*Assistant Commissioner of Patents.*